United States Patent [19]
Walsh et al.

[11] Patent Number: 5,445,356
[45] Date of Patent: Aug. 29, 1995

[54] NON-FREEZING LIQUID SUPPLY SYSTEM

[76] Inventors: Roger C. Walsh, 34 A Victoria Park Ave., Toronto, Ontario, Canada, M4E 3R9; Douglas W. Eggins, 129 Daphine Crescent, Barrie, Ontario, Canada, L4M 2Y7

[21] Appl. No.: 209,981

[22] Filed: Mar. 11, 1994

[51] Int. Cl.$^6$ ............................................. F16K 7/07
[52] U.S. Cl. .................................... 251/5; 137/236.1
[58] Field of Search ......................... 137/236.1; 251/5

[56] References Cited

U.S. PATENT DOCUMENTS 3,485,472 12/1969 Bozich .................................... 251/5

FOREIGN PATENT DOCUMENTS 1122877  5/1982  Canada .

*Primary Examiner*—John C. Fox
*Attorney, Agent, or Firm*—D. Eggins

[57] ABSTRACT

A system for pumping liquids that are subject to solidification in the line, uses a compressed gas as an expulsion medium for the liquid. A compound hose pipeline is used, having a variable volume gas chamber adjacent a transfer passage, extending the length of the line. The line may comprise an outer hose that provides an air annulus about a collapsible inner hose, through which the pumped liquid can flow. Air or other gas admitted to the annulus operates to expel the liquid from the inner hose, either upon the loss of pressurization of the liquid in the inner hose, or upon the application of adequate pressure within the gas annulus to discharge the liquid from the inner hose. A compartmented hose has a separating disphragm running the length of the hose, where admission of gas to one side of the diaphragm diminishes the adjoining chamber of the hose. When liquid is pumped, the diaphragm is displaced laterally, permitting full flow in the hose. The system may be self priming, using a source of vacuum to remove the air and expand the volume of the liquid transfer hose portion, to induce filling of the transfer flow portion of the hose or pipeline, followed by an emptying phase, by re-applying air pressure. The system can use piston or centrifugal type pumps. A gas compressor can serve as the sole pumping medium. This "frost-free" water service is suitable for domestic water supply to cottages and the like, and for sprinkler systems.

26 Claims, 7 Drawing Sheets

NON-FREEZING LIQUID SUPPLY SYSTEM

TECHNICAL FIELD

This invention is directed to the control of pipelines, and in particular to the displacement and purging of fluids, particularly liquids, in hoses and pipelines by use of compressed gas.

BACKGROUND ART

Certain aspects of the present invention, insofar as it is applied to the dewatering of pipes in order to prevent freeze-up, are related to the system disclosed in Canadian Patent No. 1,122,877, Gauthier, May 1982. Another system using air pressure in combination with a hose is by Erickson, U.S. Pat. No. 3,626,985 December 1971. This system is intended and suited for high flow rate agricultural systems with large diameter pipes, for operation in temperate climates.

Erickson employs a collapsible inner hose within his large diameter irrigation pipe, using air from an air tank to collapse the inner hose, and perforated drain tubes to ensure full fluid removal, to lighten the pipes and facilitate system relocation.

The persistence of the problems of water system pipe freeze-up appears evident from U.S. Pat. No. 5,014,731 May 1991, which employs an over-pressure responsive drain valve that is actuated by over-pressure generated by the anomalous increase in the specific volume of water when the temperature thereof drops below four degrees Fahrenheit, just prior to freeze-up taking place. The drain valve has a time delay, permitting line drainage, followed by valve closure and replacement flow of warmer water, to refill the system.

Canadian Patent No. 814,792 Cronin, June 1969 shows the use of an expansible rubber pipe within a rigid conduit, for transferring air-borne particulate material. Increased air pressure swells the inner pipe, to dislodge particulate material coated on to the inner surface of the expansible pipe, thus permitting it to be blown clear.

U.S. Pat. No. 4,662,829 May 1987, discloses an air-driven pump having an air-differential pressure chamber and an adjoining pumping chamber. The air chamber includes a mechanically displaced venting valve to cause cyclic operation of the system. The air chamber operates with either positive applied air pressure, or with negative pressure (suction).

In the case of avoiding waterline freeze-up, the two prior water displacement systems, of Erickson and Gauthier, do not appear to have become commercially viable, as the most widely used system at present appears to be that employing an electrically heated cable, such as that of the Heat-Line Corporation, or the Pyrotennax ® system. The latter system presently has a cost of about $39 per meter ($12 per foot), and with rather high associated running costs for the required electrical current consumption, at about 22-watts per meter, (7-watts per foot) when active.

One of the problems that has occurred with the above referred-to Gauthier system, that may have prevented its commercial success, is the failure of its flexible-walled inner hose, where it secures to the end fitting. In use, upon repeated cycles of collapse and expansion, the thick-walled hose fails in tension. Gauthier relies upon the inherent self-restoring tendency of a thick-walled gum-rubber hose both to expand diametrically under pumping pressures, and to contract subsequently, upon cessation of pumping, so as "to provide significant dewatering of the hose on depressurization of the hose". This effect is assisted with the application of air pressure, from a residual air cushion surrounding the hose.

DISCLOSURE OF INVENTION

The present invention provides a fluid transfer system having a compound hose link, with a resilient deformable hose portion to provide a compressible flow path passage for a transfer fluid, located adjacent an expansible gas chamber to receive a purge fluid, to expand the gas chamber and compress the flow path passage; for connection of the compound hose, in use, between a transfer fluid supply source and a receiver for the transfer fluid; and gas supply means to control the gaseous pressure within the gas chamber, to thereby control the instantaneous available volume of the transfer fluid path passage.

In one embodiment the compound hose comprises a resilient walled inner hose within an enclosing outer hose, to form a gas space therebetween.

In another embodiment, an ostensible single hose has a logitudinally extending, transverse partition diaphragm, that can lie against one portion of the inner surface of the hose, or can reverse its curvature, to lie against the opposed inner surface of the hose. Thus, a full volume liquid passage or a separated, full volume gas chamber is provided, in accordance with the pressure conditions being applied against one face or the other of the partition diaphragm.

The partition diaphragm may be of such laterally elongated extent, when viewed in the cross-section of the hose, to lie against the wall of the hose, on one side or the other, in a substantially unstretched condition, effectively so as not to deform the hose cross section, nor stress the diaphragm.

In another embodiment, the inner hose may have a wall portion thereof joined to an inner segment of the outer hose. The diaphragm may be circular, or other shape, preferably being co-extruded with the hose outer wall. Due to its substantially unstressed condition when in use, a laterally elongated diaphragm may be made relatively thin-walled.

The various embodiments of the compound hose are suited for use in a so-called "frost-free" water system, where the water transfer feeder line is subject to freeze-up, due to low temperature ambient conditions, where temperatures even below zero Fahrenheit may be experienced. The compound hose is purged of water, when not actively engaged in transferring water.

For one two-hose embodiment of the compound hose there is provided a connector to provide access to the aforesaid resilient inner hose, the connector having a cylindrical barrel portion for entry within the outer hose and the inner hose, a reduced diameter portion of the connector barrel portion having a stress-reducing member located thereabout in interposed, peripheral supporting relation within an inner surface portion of the inner hose, and collar means to retain the stress-reducing member in retained relation on the barrel. This arrangement has been found to overcome the tensional failure of the inner hose, experienced in the Gautier system, above, so as to promote the longevity of the inner hose.

The aforesaid stress-reducing member is preferably an O-ring, being retained on the barrel by a collar portion of increased diameter, located inboard of the O- ring. A clamp encircling the outer hose also compresses the inner hose in sealing relation with a barrel portion of the connector, adjacent its threaded end.

A further embodiment of the invention includes adaptor means for attachment to the outside of the hose, to give sealed access to the gas or air receiving compartment, and to which a vacuum or compressed gas service may be connected. This adaptor can serve either type of system hose embodiment.

Another embodiment includes a line connector for connecting a compound double-hose to a pump inlet. The connector incorporates a single outer clamp to secure both compartments of the hose in sealed relation to the connector, also referred to above.

The improved system may be used with either a centrifugal or piston pump, or may have a gas compressor serving as the sole driving agency, in combination with either type of the two compound hoses.

In the case of a centrifugal pump, where a submersible type can be used, then be removing the foot valve normally provided, under most topographies the system can be self draining, using a so-called gas-sealed system wherein the air space contains a permanent gas charge. A supplementary gas bottle may be connected to complement the system gas capacity, thus making it possible to operate satisfactorily at a reduced initial gas pressure, or with a smaller gas annulus.

In operation, the pump will normally deliver water into a system such as a domestic supply, pumping against a water back-pressure ranging from a low of about 40 psi, up to a cut-out pressure as much as 70 to 80 psi. Upon the cessation of pumping, with the resulting associated drop in line water pressure to zero (gauge), the residual air pressure in the gas-filled line effectively compresses the water line, so as to discharge the water content thereof back through the pump, to the source.

Where a submersible pump is not feasible, then the location of the pump above the source is dependent upon not exceeding an inductive lift head of about 9 to 10 meters (about 27 to 30 feet). This also applies to a piston pump, being the limiting head that can be drawn, i.e. slightly less than 1-atmosphere.

In the case of a single-acting piston pump, where one side of the piston displaces air, referred to herein as the "air-side" of the pump, then be making connection of the "air-side" of the compound hose to the air side of the pump, through a sniffler valve, a vacuum can be induced in the air-side of the compound hose so as to expand the water portion of the hose, and induce liquid inflow thereto. This serves to prime the hose, to serve in a liquid induction mode.

The provision of a non-return foot-valve to the inlet end of the compound hose, and of a low pressure relief valve at or adjacent the liquid delivery end thereof then permits discharge of the liquid content of the compound hose under the influence of the relatively low purging air pressure in the air-side of the hose.

The low-pressure relief valve is lightly spring loaded towards an open condition, such that the application of normal liquid pumping pressure closes the valve, and normal delivery of liquid takes place through the hose delivery end. However, upon cessation of pumping, the consequent drop in internal pressure, enables the lightly loaded spring to open the valve, to commence drainage of the liquid-containing portion of the hose. The draining process is completed by the application of air pressure to the air-side of the compound hose, at a pressure insufficient to close the drain valve.

A further aspect of the compound line of the present invention is the operation thereof as a liquid pump, in cooperation solely with an air or other gas compressor and a control circuit. The control circuit may include a pressure bottle, a vacuum bottle, a timing device and a gas flow switching control valve, such as a spool valve.

This latter gas-driven pumping system can have a closed gas circuit. Optimally, the circuit may comprise a closed circuit having a pressure bottle connected to the compressor outlet and a vacuum bottle connected to the compressor inlet. A timer or pressure controlled spool valve can then control the connection of pressure gas to the compound hose, in liquid discharge or liquid inflow inducing relation. This use of a closed gas circuit enables the use of gases other than air, if desired, such as an inert gas when pumping an inflammable liquid. The use of dessicant-dried air also is facilitated.

The effectiveness of such a gas-driven pumping system may be optimized by setting of the timer or other control to control the respective durations of the liquid induction and discharge phases, so as to achieve sensibly optimum filling and emptying of the liquid transfer hose portion in substantially minimum times.

An electrical, hydraulic or pneumatic control system can be used. The control system may incorporate a thermostatic enabling switch, to activate the system when conditions warrant its use.

The present invention can also include, in the case of more complex liquid distribution systems, a drainage control employing a Tee connector having a short drop limb, to serve as a drainage collector. Drainage from the collector is controlled by means of a low pressure pneumatic control, responsive to the drop in liquid pressure when the system pump cuts out, or the gas or air discharge portion of the cycle is completed. Thus, when the pump stops, the delivery pressure drops to zero. The pneumatic control can be made responsive to this pressure change, to then open the drain Tee.

In the case of a dual hose having a 20 psi residual charge in the air space, with the compression of the water hose completed by expansion of the gas, in one embodiment the air pressure was found to drop to about 7 psi, which pressure drop could be selected as a system control parameter, in cooperation with a pneumatic or hydraulic sensor/controller.

In the case of the Tee collector, a pneumatic controller responsive to a predetermined low pressure in the system can respond thereto, and open the drainage valve of the Tee connector, to specifically drain any low-lying point of the system. Conversely, the system drain can be made responsive to an air pressure "bump", found to occur when the water flow is suddenly stopped.

Certain fatty acids are prone to solidify or "freeze" at room temperatures, and by using a compound hose according to the present invention, and pumping the fatty acid material at an elevated temperature, the hose may be readily emptied upon cessation of pumping, in accordance with the present invention, by the application of air or a selected gas under pressure to the air-side of the compound hose, to purge the transfer portion of the hose.

This keeps the system operable, and substantially free of solidified matter at all times. Any slight solidified deposit that may be left is insufficient to block the system, and a succeeding flow of hot material is generally sufficient to melt any previous such residues. Such as also usually the case with ice and water.

In the case of the two pipe system, the system may be operated using an existing rigid pipe, such as a metal pipe of adequate inner diameter to receive the inner hose in threaded relation therethrough. The aforesaid connections are then provided for the controlled admission of pressure gas, to collapse the inner hose.

It is contemplated that a pumping system according to the present invention and using a compressed gas as the driving fluid can operate with solar power, using a Stirling cycle engine to drive the compressor, in order to pressurize the requisite gas bottle, and evacuate the other bottle. The compressor may constitute a part of the Stirling engine, and the gas for the pumping system may also be the working fluid for the Stirling cycle.

In the case of a system provided as a "frost-free" water supply system, particularly where the system is "open", i.e. it uses fresh atmospheric air for each cycle, the use of an air dryer, such as silica gel material as a dessicant for the gas supply may be desirable.

The present invention thus provides a fluid transfer system having a compound hose with a first hose portion having a through passage therein for the transfer of a fluid therethrough, a second hose portion within the first hose portion, a space within the first hose portion and bounded by the second hose portion, to receive a gas under pressure, in use the gas receiving space being expansible, to substantially eliminate the through passage. In an embodiment wherein the two hose portions have a common peripheral wall portion the aforesaid gas receiving portion may comprise an interior hose, being accessed through the common peripheral wall portion. The gas receiving portion may comprise the space lying between the interior and the exterior hose.

The present invention further provides a fluid transfer system having a compound hose, the first and second hose portions having a flexible diaphragm forming a common wall therebetween, and being laterally displaceable on passage of the transfer fluid to enlarge the through pasage therefor; and upon reduction of pressure of the transfer fluid and application of gas pressure to the second portion, the diaphragm being reversely displaceable to displace the transfer fluid from the first hose portion while diminishing the through passage to the point of substantial elimination thereof.

A thick-walled outer plastic pipe has the advantages of being relatively indestructible, to permit being laid in the open, while conforming generally to the topography of the terrain The flexible inner hose of the two-hose system has to substantially flatten, in order to effect substantially complete liquid purging, and pure latex gum rubber, neoprene, or Sanaprene ® which has received FDA approval for domestic water systems, are suitable for such use, usually in the form of a thick-walled inner hose.

Silicone rubber and vinyl plastic such as Tygon ® also may prove suitable for all or portions of the compound hose. Kraton ® and Serlink ® are also promising plastics for such use, particularly where high strength extrusion plastics are required. Outer wall reinforcement may be provided.

In the case of the divided or compartmented hose, having an intermediate disphragm therein, the diaphragm may be of such lateral length, when viewed in cross section, as to conform itself to one or the other of the adjacent walls of the tube wall, in accordance with the prevailing pressure within a respective compartment of the divided hose, without being substantially stretched. The diaphragm then serves as a substantially unstressed interface between the two fluids.

In the case of a fluid supply system requiring an extended run the compartmented hose may be available in a sustantially endless run, such that intermediate joints may be avoided.

A continuously extruded unitary diaphragm hose construction is preferred.

The compartmented hose provides the advantage of smaller overall diametrical size for equivalent flow capacity, as compared with the dual hose arrangement. It may also operate with a thinner and stiffer outer wall structure. It is contemplated that the partition may be of a thinner and more flexible plastic material, compared to the inner hose of the coaxial double hose arrangement.

In the provision of a frost-free system incorporating purging hoses in accordance with the present invention, certain other novel system components facilitate the operation of the subject system.

In certain embodiments, drainage fittings are provided that are less subject to freezing than presently available valves.

One drainage valve embodiment incorporates a through-flow passage having a drainage drop-leg is downwardly off-set, forming a shallow Y-section, to facilitate drainage of liquid therefrom.

The valve, located within the drop leg, may be spring-loaded in an opening sense, to open itself to an auto-drain drainage mode when the pressure in the through passage falls below a preset value. Thus, when the pressure of the transfer liquid drops, upon the cessation of pumping, in the case of a permanently gas-charged compound hose the applied pressure will be somewhat less than the pre-set auto-drain value, and the valve will open and drain the transfer liquid, under the influence both of gravity and the line-purging gas pressure of the compound hose.

Another drainage valve embodiment, including as part thereof a shallow Y-section, may also have an upwardly projecting outlet incorporating a shut-off valve. A series of such fittings spaced along a compound hose of the present invention can connect with an installation serving a number of dwellings, such as stationary railroad cars for instance, wherein the respective outlets each connects with a respective car. Upon the commencement of applying pumping pressure, a person can then walk from car to car, operating the respective shut-off valves, first to supply liquid, and then to shut off the supply. Upon the shutting down of the pump the self draining valves, preferably each located opposite a respective outlet, will operate, permitting the gas-charged compound hose to purge itself of transfer liquid.

The auto-drain valves will remain in an open condition until such time as the liquid transfer line is repressurized, by the resumption of pumping. The progressive passage of liquid from the pump and along the line, in opening up each section of the gas-compressed hose, results in a rapid pressure build-up, successively in each auto-drain valve as the "wave" of liquid arrives at the respective valves, in succession, causing each valve to close, with consequently little leakage.

An auto-valve embodiment has a flap-type valve member with a restrictive jet located thereabove, to direct a jet of liquid downwardly against the flap in closing relation thereagainst, thereby serving as a servo-type auto-valve.

The flap-type valve may be of one-piece plastic or rubber die-cast construction. The self-opening characteristic of the valve may be achieved as the "memory" of the flap hinge portion.

In an embodiment incorporating a flap-opening spring, the spring may be an open ended plastic bellows tube, preferably located within the valve and above the flap, so as to be as far removed as possible from an outside, freezing environment.

The auto-drain valves of the present system may be insulated against wind-chill and consequent freeze-up.

The system may embody an environment-sensitive valve means, to enable the operation of the frost free aspects of the system when environmental conditions warrant such operation.

BRIEF DESCRIPTION OF THE DRAWINGS

Certain embodiments of the present invention are described by way of illustration, without limitation of the invention thereto, reference being made to the accompanying drawings, wherein.

DETAILED DESCRIPTION OF THE INVENTION

Figure 1:
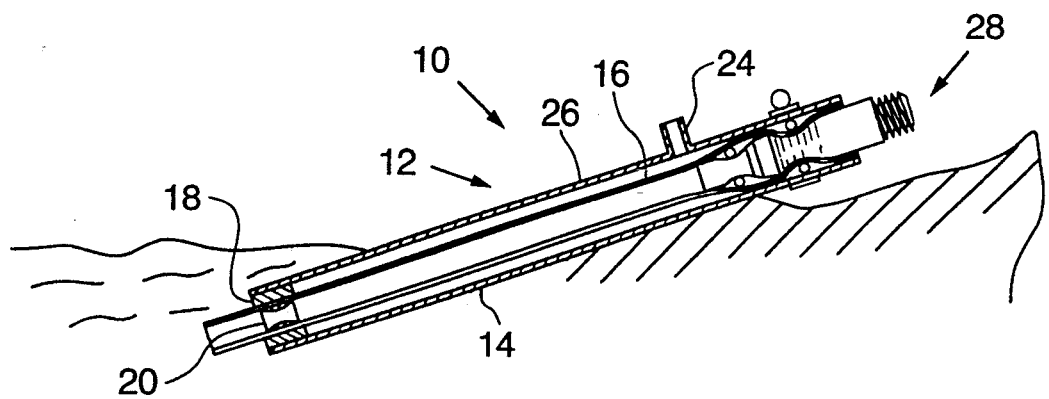
FIG. 1 is a schematic side view in partial section showing a portion of a coaxial first system embodiment.

Referring to FIG. 1 the system portion 10 comprises a compound hose 12 having a semi-flexible outer hose portion 14 and a smaller diameter inner hose portion 16 therein.

A closure plug 18 seals the lower end of the outer hose 14, being in bonded sealing relation with the outer wall surface of the inner hose 16. An annular ferrule 20 may be used to support the hose 16 in sealing relation with the closure plug 18.

The inner hose 16 is shown without a foot valve or other non-return provision at its lower end 22, being thus free to accept the inflow or the outflow of liquid therethrough.

A gas flow connector 24 accesses the gas space 26 that surrounds the inner hose 16, the space being referred to herein for convenience as the gas annulus. By pressurizing the space 26 with gas, such as air, the inner hose is collapsed, and the liquid therein is discharged. Maintenance of that gas pressure retains the hose 16 in its compressed, empty condition, changed from its compressed, collapsed condition to an expanded, liquid-inducing condition wherein atmospheric pressure causes the inner hose 16 to fill with liquid, to the extent possible in the conditions that prevail.

Figure 2:
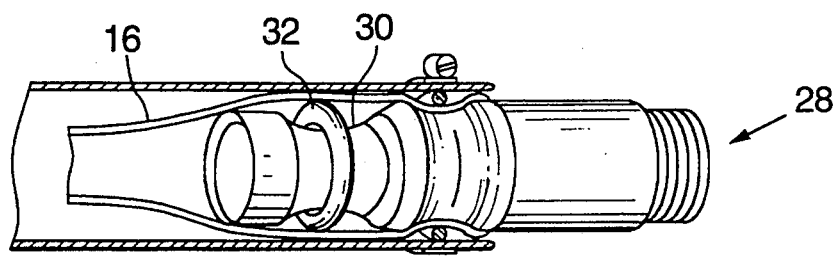
FIG. 2 is an enlarged side perspective in partial section of a portion of the FIG. 1 embodiment.

Referring also to FIG. 2, a threaded connector 28 at the upper end of the compound hose 12 provides for connection of the compound hose to the inlet or induction port of a pump (not shown).

It should be born in mind that while the compound hose 12 is illustrated, purely for convenience of illustration as being inclined in self-draining relation with the body of water, this may well not be the case. Thus, upon cessation of pumping the application of pressurized gas to the connector 24 will flatten the inner hose 16 and cause it to empty back to the source.

Upon the commencement of pumping, the application of vacuum to connector 24 draws the inner hose 16 into its expanded state, with a flow of liquid being induced therein, due to the external effect of atmospheric pressure thereon. Thus, a pump attached to the outlet end can be self priming, being connected in inductive flow relation with the compound hose 12.

In the case of a submerged pump located at the lower end of the compound hose 12, the gas annulus 26 can be permanantly charged with pressure gas at a comparatively low pressure, such as 20 psi. When the inner hose 16 is compressed, the gas pressure in the then-expanded annulus, in one embodiment, dropped to about 7 psi.

Upon energizing of the pump, the delivery of water to the hose 12 overcomes the lower pressure gas and opens the hose 16 to liquid flow. When the receptor water system becomes full, the pressure cut-out will operate, to switch off the pump. This instantly depressurizes the inner hose 16, such that the resident air pressure within the annulus 26 then collapses and empties the inner hose 16 back through the submerged pump, which has no foot valve, thereby permitting such reverse flow.

Referring particularly to FIG. 2, it wil be seen that connector 28 has a reduced collar portion 30 over which is located an O-ring 32, upon which the inner hose 16 bears in load distributed relation. The O-ring 32 permits the hose 16 to adjust itself axially thereacross as it is compressed and then expands, cyclically, for each cycle of operation. This accomodation has been found to substantially overcome the tensile failure previously present in the inner hose of the Gauthier system.

Figure 3:
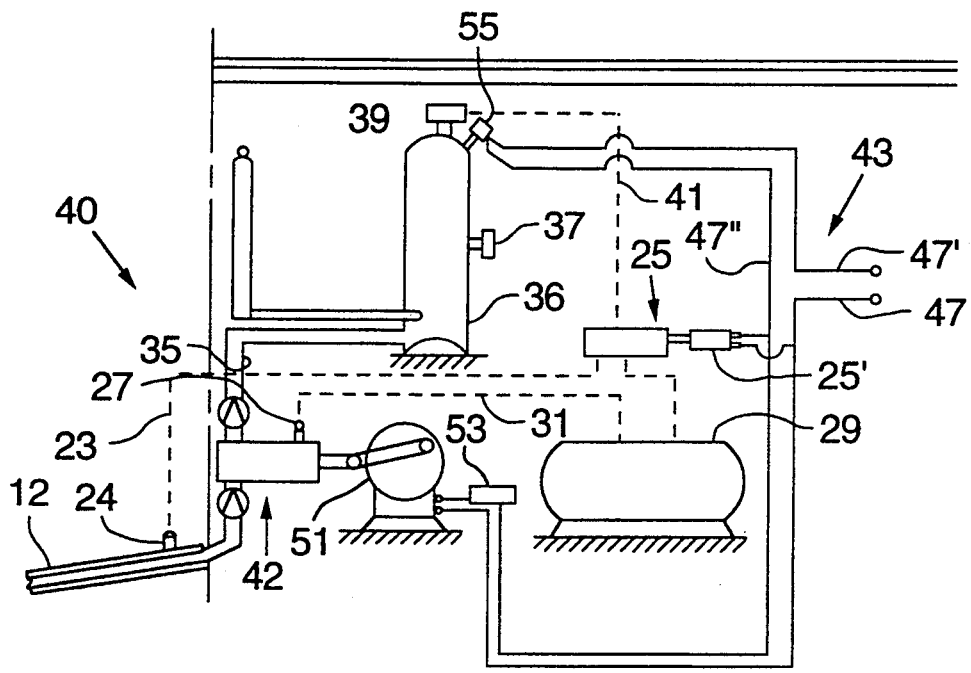
FIG. 3 is a schematic side view of a novel domestic system including an induction hose, in accordance with the present invention.

Turning to FIG. 3, a system 40 has a reciprocating pump 42 located within the thermally protected environment of a building, that is services at the intake side by a compound hose 12, as of FIG. 1. The annulus gas flow connector 24 of hose 12 connects by line 23 to a solenoid valve 25. The air suction connection 27 on the air side of the pump 42 connects by line 31 with a vacuum tank 29. The vacuum tank 29 connects by line 33 with solenoid valve 25.

The outlet 35 of pump 42 connects to a water/air pressure tank 36 that forms a part of the water system that is being supplied, the remainder of which is not illustrated.

The tank 36 is provided with an automatic air pressure control regulator 37 (AAPC regulator), a commercially available device.

The regulator 37, by virtue of the rise and fall of water level and water/air pressure in the tank 36, as the system goes through its repeating cycle, induces a small quantity of outside air as supplemental air into the tank 36, to maintain the upper air cushion charge substantially constant, over time.

A combined air take-off and pressure reduction valve 39 from the tank 36 connects by line 41 with solenoid valve 25, to provide pressure air thereto.

An electrical circuit 43 connects by conductors 47, 47' to the electric motor, through a time delay 53; and also through pressure responsive cut-out 55, illustrated as being mounted upon the tank 36. Such a pressure responsive cut-out 55 may however be mounted upon the pump instead.

The solenoid portion 25' of the solenoid valve 25 is connected across the conductors 47, 47''.

In operation, just prior to the commencement of a "fill" cycle, the pressure in tank 35 having dropped down to a pre-set low limit, typically about 40 psi (gauge), causes the cut-out 55 to close, thus initiating the "fill" cycle. This energizes the solenoid 25' and the time delay 53.

The solenoid 25' operates the valve 25, disconnecting the air pressure line 41 from the gas flow connector 24, and connecting the vacuum tank 29 to the has flow connector 24. This results in the rapid evacuation of annulus 26 of pipeline 12, causing the formerly collapsed hose portion 16 to expand, and inducing water to fill the hose portion 16.

The delay period of delay 53 is sufficient to permit the hose 16 to become substantially filled with water. At the end of the delay period of the delay 53, the motor 51 is energized, and pumping commences.

The hose 16 being in a filled or at least substantially filled condition, the pump 42 can self-prime very readily, if so required. It is contemplated, in the case of a self-priming pump having a draw head of some 10 meters (about 30 feet), that the aggregate draw head of the system can be as much as about 20 meters (60 feet)

During the pumping cycle the air suction connection 27 enables the pump 42 to draw-down the vacuum tank 29, by pumping air therefrom.

The filling action of the pressure tank 36 with water by pump 42, activates the AAPC regulator 37, supplementing the quantity of air present in the air cushion in the top of tank 36, to make up air previously discharged therefrom through the air take-off 39, during the preceding cycle of the system.

Upon completion of the fill-portion of the cycle, when the pressure of water and air in the tank 36 reaches the pre-set cut-out pressure, the cut-out 55 opens, to de-energize the pump 42 and the solenoid valve 25.

The solenoid valve then returns under internal spring pressure to its initial position, to reconnect the air pressure line 41 to the annulus gas flow connector 24. This admits pressurized air to the gas annulus 26, flattening the hose 16, thus causing it to discharge its water contents back to the source.

Alternative arrangements may include the provision of a drain sump within the protective confines of the building, the receive water discharged by the hose 16, using a low pressure drain valve, as described below, or a power activated servo valve.

In the case of a system having a centrifugal pump or a reciprocating pump not equipped with a suction connection 27 such as a sniffle valve, an air suction connection can be made to the water inlet (inductive) side of the pump. Air thus inducted into the pump enters the tank 36, to supplement air provided by the AAPC regulator 37. In some such instances an AAPC regulator may prove to be unnecessary.

The foregoing alternative suction connection probably could not apply to a centrifugal pump forming a part of a jet-pump system.

Figure 4:
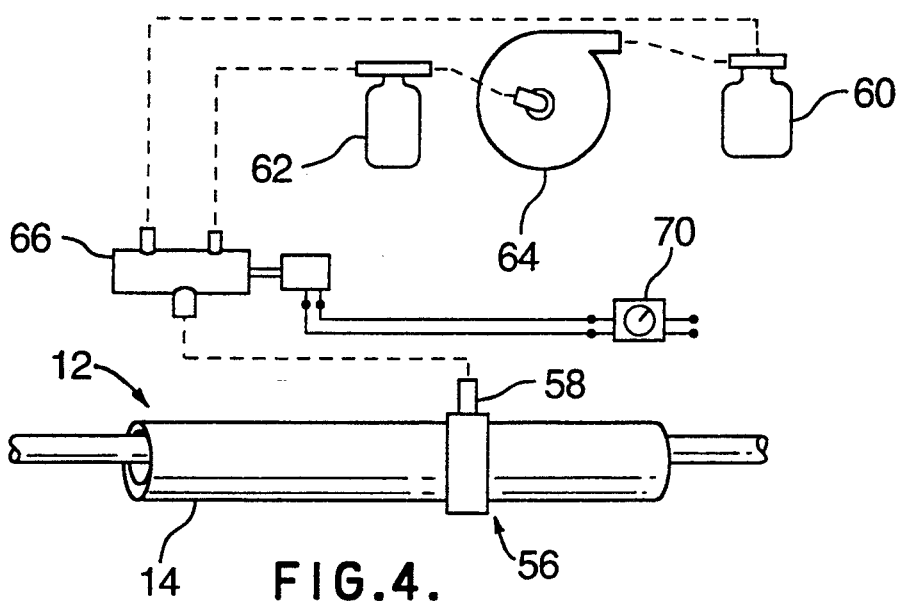
FIG. 4 is a schematic side view showing a portion of a compound, dual hose in acordance with the present invention, incorporated with a control system to provide a pumping function.

Turning to FIG. 4, a compound hose 12 has an air control connection 56 comprising a split saddle that is bolted on to the stiff outer hose portion 14. A gas connector 58 permits the application of pressurized gas or of vacuum to the compound hose 12 in respective water-emptying or fill-inducing relation therewith.

A gas pressure bottle 60 and vacuum bottle 62 are connected to the respective pressure and suction sides of a compressor 64, which bottles are in circuit with slide valve 66. Operation of the solenoid 68 is controlled by a timer 70.

On the induction portion of the cycle the control solenoid 68 connects the vacuum bottle 62 to the connector 58, thereby expanding the liquid flow path, to fill the hose portion with liquid.

During the discharge portion of the cycle the solenoid 68 connects the pressure bottle 60 to the connector 58, inflating the air side of the compound hose, and causing a purging discharge of liquid from the compound hose. The provision of suitable relief valves, either controlled by the timer 70, or by pressure responsive actuators similar to that disclosed in regard to FIG. 3, is contemplated.

Figure 5:
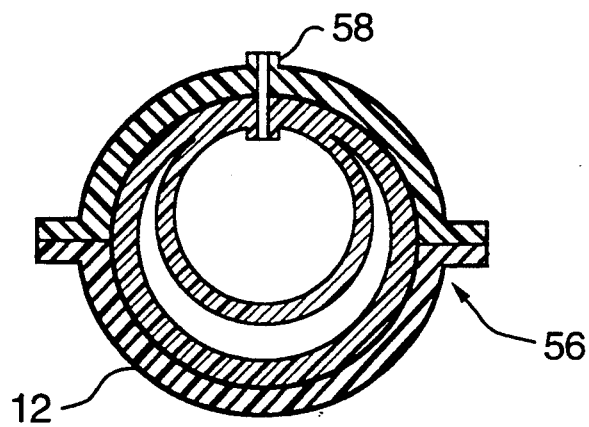
FIG. 5 is a cross section view of a compartmented hose embodiment in accordance with the present invention, having a laterally elongated diaphragm.

Referring to FIG. 5, the compound hose 12 comprises an outer hose portion and an inner hose portion having a common segment of wall therewith, being enclosed within a saddle clamp 56. The split saddle clamp has a gas connector 58 in penetrating relation with the inner hose, by which the inner hose may be inflated, deflated or connected with a pressure gauge, in the fashion of FIG. 9.

Alternative arrangements are contemplated, having a flexible diaphragm divising the interior of the outer hose into a pair of adjoining hose portions. The diaphragm may be given a lateral width substantially equal to one half the inner periphery of the outer hose wall, with the ends thereof attached to the inner wall surface at substantially diametrically opposed locations. Thus, the application of moderate fluid pressure to one side or the other of the diaphragm will suffice to conform the diaphragm in smooth, substantially unstressed pressing relation against the inner surface portion of the outer wall remote from the applied pressure. Thus the diaphragm can be extruded as a thin member of moderate tensile strength. However, the thickness, strength and stiffness should be such as to avoid any undue stressing or cracking that could be brought about by the creation of folds, due to lateral stretching and folding of the diaphragm.

Figures 6, 7:
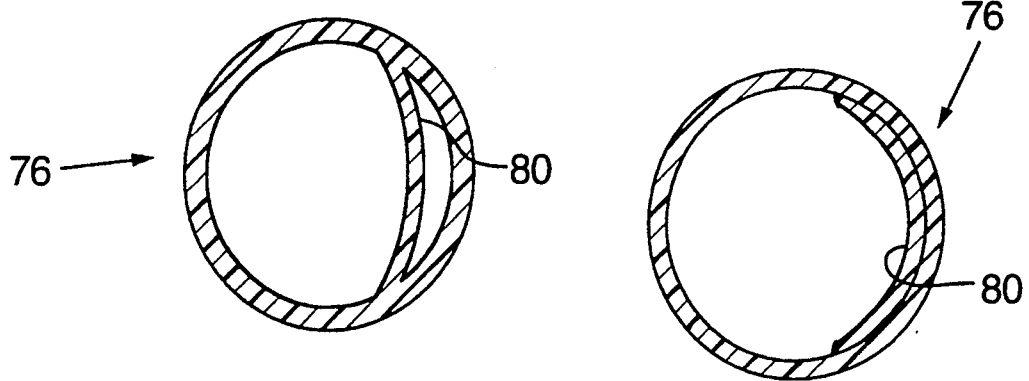
FIG. 6 is a view similar to FIG. 5, of a compartmented hose embodiment with an off-set diaphragm of short lateral extent.
FIG. 7 shows the hose embodiment of FIG. 6 in a fluid transfer mode.
Figure 8:
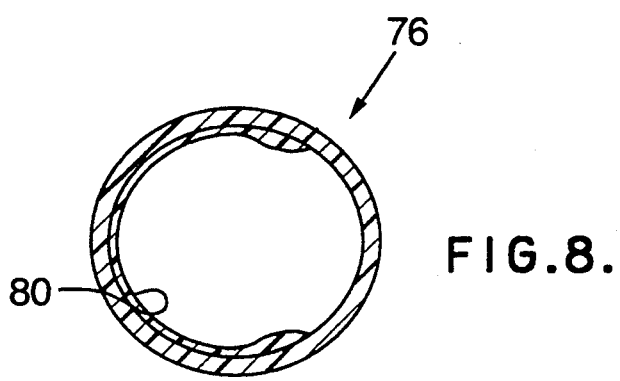
FIG. 8 shows the hose embodiment of FIG. 6 in a fluid purging mode.

The diaphragm 80 may be made off-centre, as shown in FIG. 6, such that operation of the compound hose 76 in fluid transfer function within the major segment of the hose 76 wraps the diaphragm 80 against the short (right hand) arc portion of the inner wall surface, substantially without stressing of the diaphragm 80, (FIG. 7). Operation in a fluid purging sense, by admission of pressure gas to the minor segment of the hose 76 (FIG. 8) will stretch the diaphragm 80 in its leftward displacement, tending also to possibly deform the wall 78 of the hose 76, to some extent. However, in view of the relatively lower pressure involved in the purging operation, as compared with normal operating pressure for pumping water (e.g. 20 psi v-s 60 to 80 psi), the stress level of the diaphragm and hose wall structure is comparativly insignificant. Also, the deformation of the hose cross-section from circular to something more oval contributes to the dewatering effect.

Figure 9:
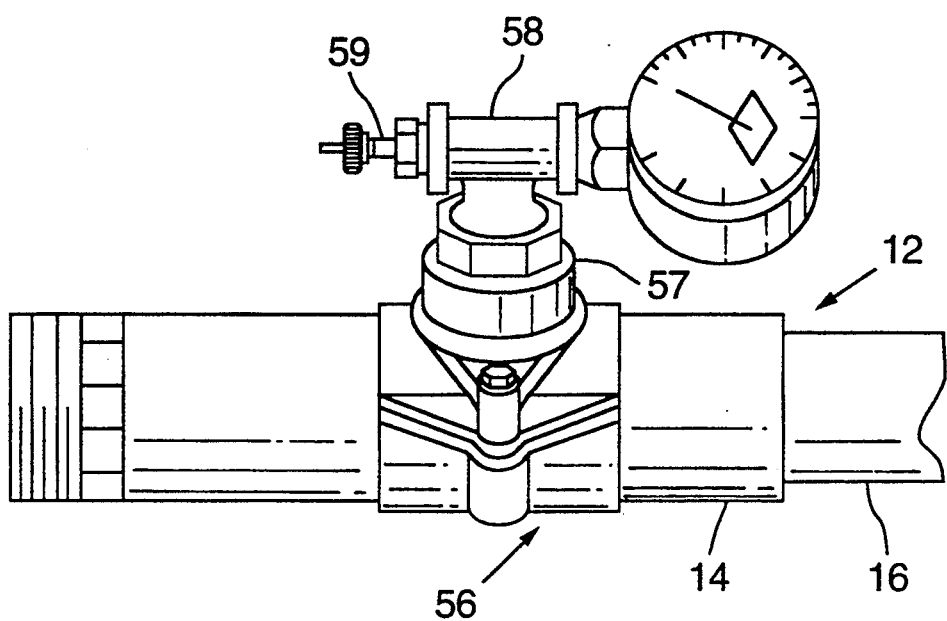
FIG. 9 is a perspective view of a connector saddle having a gas pressure gauge and gas admission valve connected therewith.

Referring to FIG. 9, a compound hose 12 of the FIGS. 1, 2, 5 or 6 configuration has a saddle-clamp 56 secured in mechanically compressed relation to the outer hose 14, which is of semi-rigid plastic construction. An internally threaded boss portion 57 receives an O-ring in sealing relation therein, to seal off the penetration of the wall of the outer pipe 14. A Tee connector 58 screwed to the boss portion 57 has a pressure gauge, and a schrader type valve 59 for inflation or deflation purposes, inserted in the respective opposite ends of the Tee connector 58.

Figure 10:
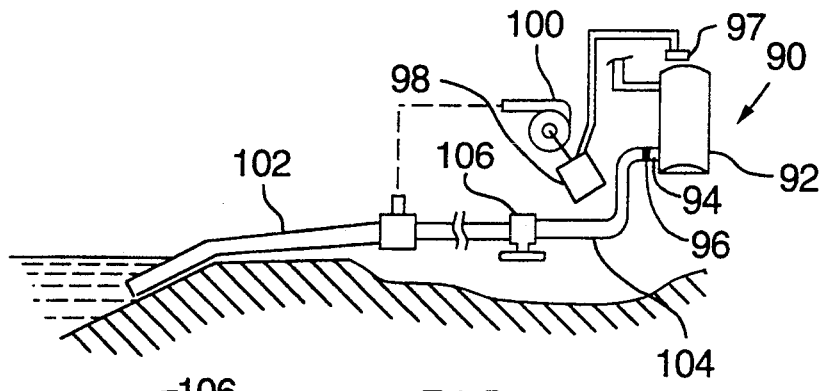
FIG. 10 is a schematic view of a composite domestic supply system.

Referring to FIG. 10, a domestic water supply 90, located within a heated building (not shown), has a pressure tank 92 having a water inlet 94 with a one-way check valve 96, to prevent reverse flow therefrom. A pressure cut-out switch 97, responsive to the water pressure within the tank 92, and which may be used to control the operation of a standard type rotary or reciprocating water pump (not shown), is connected in controlling relation with electric motor 98, to drive air compressor 100. However, the connections are such that the compressor 100 is energized when the pump circuit cuts out. Thus, upon cessation of pumping, the compressor 100 is energized.

The compressed air outlet from compressor 100 is connected to a compound hose 102 in acccordance with the present invention. The hose 102 is coupled in liquid transfer relation with a frost-free, permanently gas pressurized, self emptying compound hose 104. The coupling between the compound hoses 102, 104, is effected by way of a low-pressure responsive drain valve 106.

While reference is made to the possible provision of a standard type pump (not shown), it will be understood that the compound hose 102 may very well serve as the pump for the system, as disclosed above, by the provision of a check valve at or adjacent the water inlet end, to enable "forward" pumping displacement, under gas admission.

Figure 11:
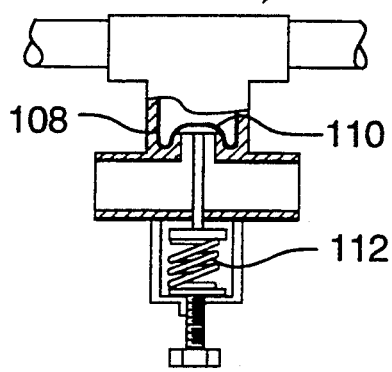
FIG. 11 shows a low pressure drain valve.

Referring to FIG. 11, the low pressure drain valve 106 has a valve seat 108, on which disc valve 110 can seat. A low-rate spring 112 serves to lift the valve 106 from off its seat when the water pressure acting thereon is less than the force of the spring 112, i.e. when pumping is terminated, and the pressure acting in the pipe system is that of low pressure air.

Upon commencement of pumping action, the flow of water under pump pressure is sufficient to seat and close the disc valve 110, thereby sealing the system. Upon cessation of pumping the valve 106 serves to drain the lines.

Figure 12:
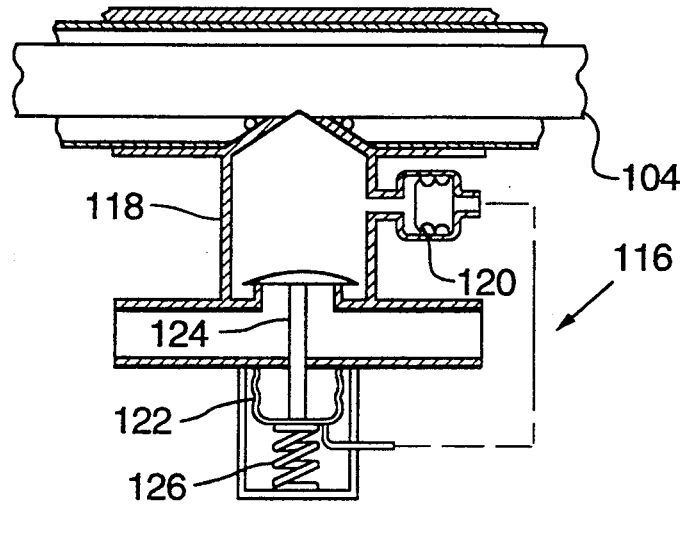
FIGS. 12 and 13 are schematic arrangements of pressure responsive drain system embodiments.

Referring to FIG. 12, a pressure-responsive valve 116 has a housing 118 containing a water-pressure responsive pneumatic bellows 120 connected in air pressure transfer relation to a pneumatic spring 122. The pneumatic spring 122 is arranged in opposing relation to a coil spring 126, such that expansion of pneumatic spring 122 over-rides the coil spring 126, to hold the valve 116 in a closed, sealing condition. In operation, the application of pumping action to the system provides sufficient water pressure against bellows 120 to compress the bellows 120, so as to expand the pneumatic spring 122 and close valve 116. Termination of pumping action permits the valve 116 to open, so as to drain the line.

It will be seen that the pneumatic spring 122 may be directly connected to a pumping-line line air supply, in installations where the air supply is suitably located in the near vicinity of the drain valve 116.

Figure 13:
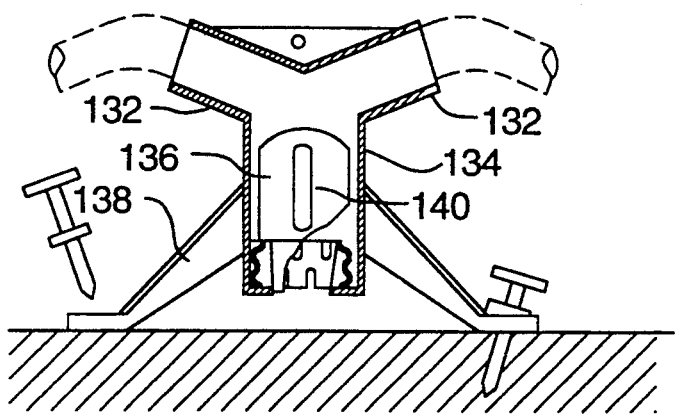

Referring to FIG. 13, an elevated drain valve 130 has opposed inlets 132, for coupling thereto in downwardly inclined draining relation a pair of adjacent hose segments, indicated in phantom.

A cylindrical valve body portion 134 accomodates a float valve 136 therein.

The valve 130 stands upon three flanged legs 138 which may accomodate ground anchor provisions.

The float valve 136 is illustrated as having three or more centralizing guide fins 140.

The valve 130 is illustrated as having a perforated reinforcing top web, the perforation of which may be utilized for suspending valve 130, to militate against ice fouling beneath the valve 130 as a consequence of repeated drainages in extrenely cold weather.

Figure 14:
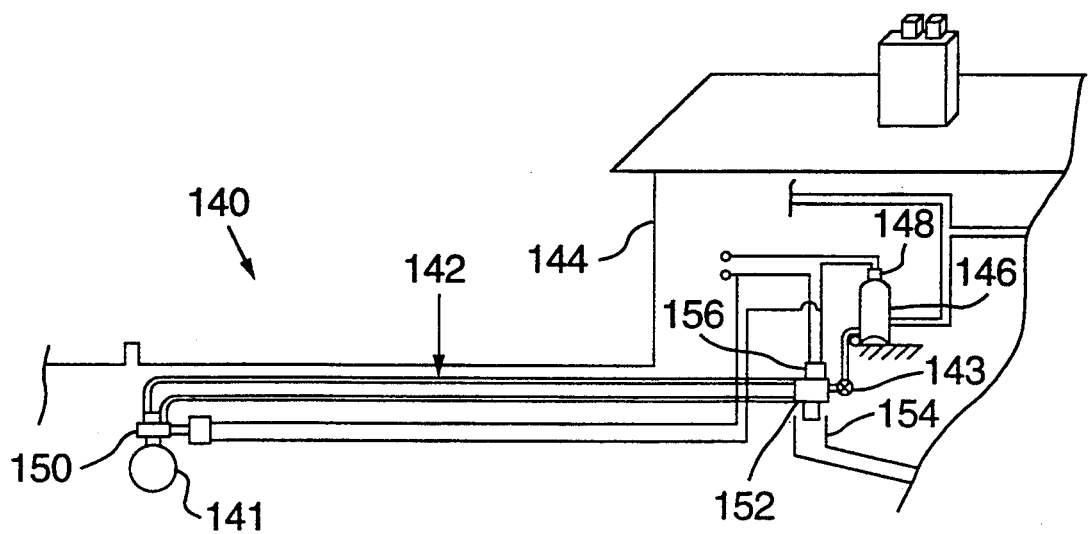
FIG. 14 is a schematic arrangement showing elements of the present invention in a domestic system supplied from a water main.

Referring to FIG. 14 there is illustrated a domestic supply arrangement 140 wherein a water main 141 has a self-purging line 142 connecting with a house 144, by way of a check valve 143.

The house contains a pressure tank 146 that serves a domestic water system, illustrated schematically.

A pressure responsive switch 148 on the tank 146 is connected in-circuit with a solenoid valve 150 mounted on the water main 141.

The line 142 is a self-purging line containing air or other gas at a predetermined pressure.

A drain valve 152 for the line 142 is located within the house 144, being illustrated as positioned over a waste drain 154.

However, in order to conserve water drainage water collection sump equipped with a pump may be readily substituted for drain 154, to feed purged water to a domestic service, such as the toilets.

The drain valve 152 is illustrated as being controlled by solenoid 156. Again, it will be understood that as an alternative a low pressure automatic drain such as that illustrated in FIGS. 11, 12, 13 or 19 may be used.

A pressure sensitive switch 158 on the tank 146 serves to control the system.

At a predetermined low pressure in tank 146 the switch 158 is closed. This closes the drain valve and opens the solenoid valve 150.

The application of mains water pressure to the liquid transfer portion of the line 142 serves to expand that portion of the line, while causing compression of the gas-filled adjoining portion of the line 142. Water flows from the main 141 to the tank 146, to fill it.

When the tank 146 is filled, and the air cushion thereof compressed to a predetermined cut-out pressure, the switch 158 is opened.

The solenoid valve 150 closes, cutting off the water supply, and the drain valve 152 opens, to drain the line.

Gas pressure in the line 142 compresses the liquid transfer portion of the line 142 at a relatively low pressure, causing the line to drain through the valve 152, and leaving the line 142 substantially fully de-watered. The check valve 143 precludes the loss of water from the house system and the tank 146, to drain.

In place of the electrical circuit illustrated, it will be understood that a pneumatic or hydraulic servo system may be used, to actuate the water main cut-off valve and the drain valve, and relying upon the changes in water pressure within the tank to cause actuation of the respective valves.

Figure 15:
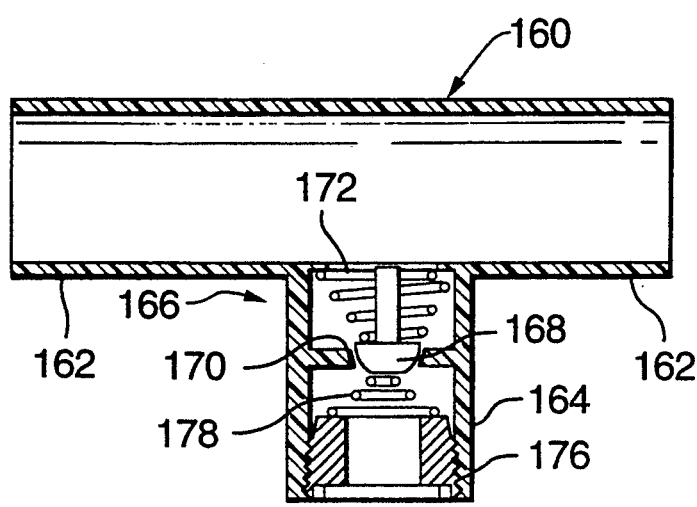
FIG. 15 is a schematic side section of an adjustable relief valve.

Referring to FIG. 15, an adjustable relief valve is shown, suitable for use as a check valve, or for an automatic, low pressure drain valve in the present types of system The valve 160 is shown in a Tee configuration, having opposed coupling ends 162, and a Tee drop leg 164 containing the adjustable valve 166. The Tee coupling ends 162 may be downwardly inclined to drain inwardly to the drop leg 164.

A valve head 168, illustrated as being of semi-spherical form is seated in a tapered seat 170, being held in a firmly seated condition by a spring 172.

Within the outlet housing 164 there is adjustably screwed a bushing 176 upon which is mounted a counter-spring 178 that bears upwardly against the valve head 168, in opening biasing relation thereagainst. Rotational adjustment of the bushing 176 respositions it axially within the outlet housing 174, so as to correspondingly adjust the counter-spring 178, thereby moderating the resultant loading acting upon the valve head 168.

The counter spring 178 is preferably of plastic, such as Koron, being or corrugated section, with wall perforations top and bottom, to prokmote ready and complete drainage, and to minimize the danger of freezing, otherwise encountered with metal springs.

Figure 16:
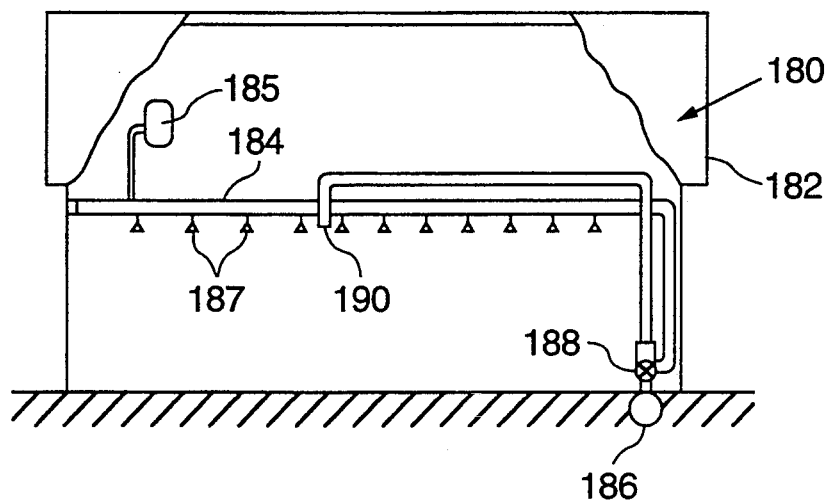
FIG. 16 shows a schematic sprinkler system using the invention

Referring to FIG. 16, a schematic sprinkler system 180 is located within a building 182, that may be unheated, and subject to freeze-up. The failure of the power supply can readily lead to this situation. The water supply hose portion 184 of the system comprises a self-purging hose in accordance with the present invention, preferably having a permanent gas charge in the expansible gas portion thereof. An auxiliary gas bottle 185 also may be provided, to enhance the gas capacity, and by operation of the system at a lower gas pressure, enhancing the water flow capacity. Water supply to the sprinklers 187 of the system is from a mains 186, with admisssion of water under the control of a servo valve 188. This valve may be electrically, hydraulically or pneumatically operated, with a thermally sensitive activating sensor 190 set in the ceiling or other suitable location.

In operation, the sprinkler system is normally de-watered, the permanently gas-charged water line being quite empty.

Upon the occurrence of an over-temperature being sensed by the activating sensor 190, the sensor valve 188 is opened, and water under mains pressure overcomes the gas pressure acting on the line, and is admitted to the water line, and sprayed from the sprinklers. Upon the consequent reduction of the temperature being sensed by the sensor 190, the water supply may be automatically turned off. At this juncture the gas pressure in the system compresses and de-waters the delivery line, to preclude the danger of freeze-up.

Alternative use of system elements can be made. A further embodiment that is contemplated comprises a frost sensitive system for spraying water over fruit trees, to prevent frost damage to the crop, particularly soft fruit crops that are very frost sensitive.

Use may be made of a freezing-point sensor such as one that relies upon the anomalous expansion of water in the range 4 degrees Celsius to zero Celsius, to trigger the servo-valve, and supply water to misting sprays serviced by a normally dry, gas dewatered line in accordance with the invention. Upon the temperature falling to the critical range of the sensor, the servo-valve is operated and high pressure water admitted to the normally dry, gas-compressed water delivery line, thereby actuating the spray system and off-setting the damaging effects of the frost to the trees and crop, such as citrus fruit and the like. When local temperatures rise sufficiently the action is reversed, the servo-valve turned off, and the delivery line is automatically de-watered by gas presssure present in the system, leaving the system "ready".

This system need not be dependent upon the availability of electrical energy, and can be totally automatic in its operation.

Figure 17:
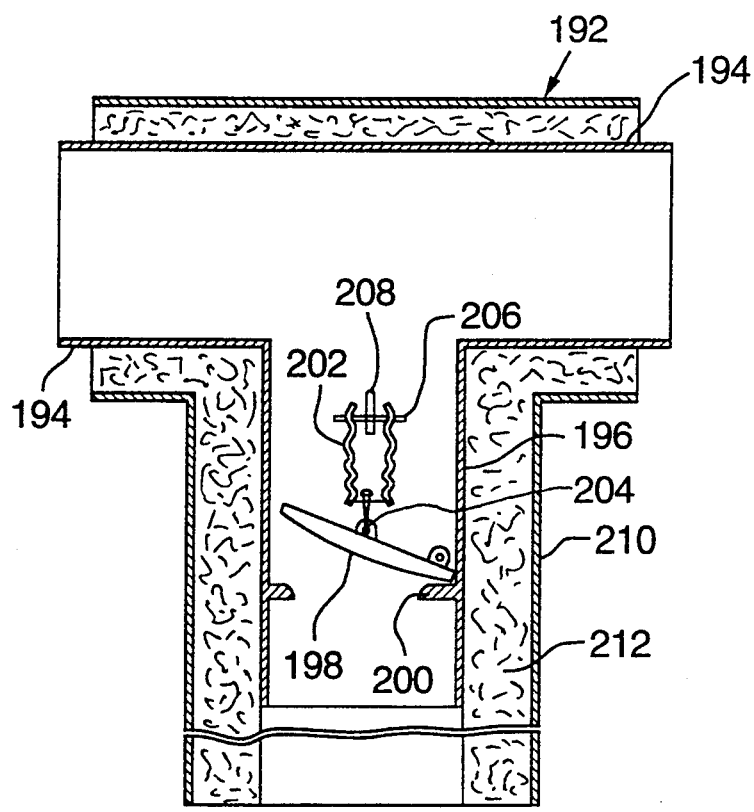
FIG. 17 is a diametrical section, in elevation, of a low pressure, self draining auto-valve.
Figure 18:
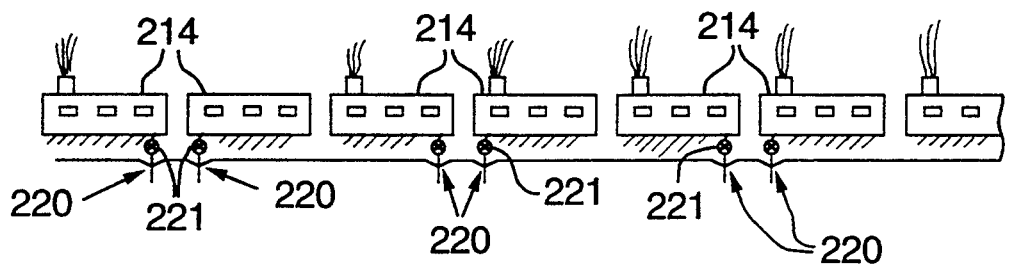
FIG. 18 is a schematic plan view of a multi-service installation.

Referring to FIG. 17, a low pressure drain valve 192 has a through passage portion 194 which may be centrally declined, in the fashion shown in FIG. 18, with a drop leg 196.

A flat valve 198, pivotted at 199, seats on annular valve seat 200. A tension spring 202, illustrated as being of corrugated plastic tube, is typically set to open the valve at a water pressure sensibly of 10 psi, being pivotally pinned at 206 to cross flange 208. In operation, the admission of water or other suitable liquid under pressure to the system causes the flap valve 198 to close, after limited leakage. Subsequently, upon the termination of pumping, the drop in pressure in the system permits the spring 202 to raise the flap, and the drain to operate, drying out the system. The adoption of an immersed, hollow plastic spring 202 minimizes the formation of ice, under extreme conditions.

Figure 19:
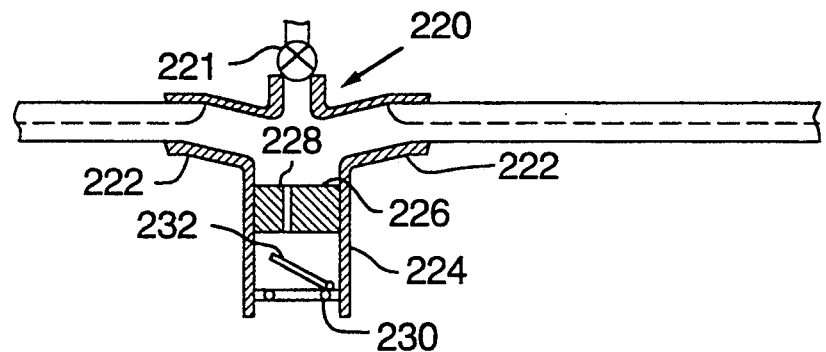
FIG. 19 is a side section of a servo style auto-valve.

FIG. 19 shows a number of units 214, such as huts, bungalows, carriages on a siding etc., serviced by a gas-purged surface water line in accordance with the invention, incorporating four-way servo valves 220, serving as connectors, shown in detail in FIG. 19, each having a delivery valve 221, possibly hand operated Referring to the FIG. 19 embodiment, the servo-valve 220 has a dropped centre portion, between the ends 222, into which ends a compound hose may be sealed. An annular seat 230 has a valve flap 232 attached thereto by way of a permanent hinge, as an injection molding. Located in the drop leg 224 is a plug 226 having a jet aperture 228 therein, aligned to impact the flap 232. In use, upon the admission of pressurized liquid to the valve 220 a jet of the liquid will impinge forcibly upon the flap 232, forcing it closed, with minimal loss of liquid therepast prior to its closure.

Opening operation of a pressurized gas compound hose causes a wave of pressurized liquid to move rapidly along the pipe, and forces open the gas-compressed liquid transfer hose portion. The wave, on reaching a low pressure drain valve in the open, self draining condition, rapidly forces it to a closed condition.

The FIG. 19 sevo type of self-draining valve embodiment is particularly efective in that regard, to minimize liquid wastage.

Figure 20:
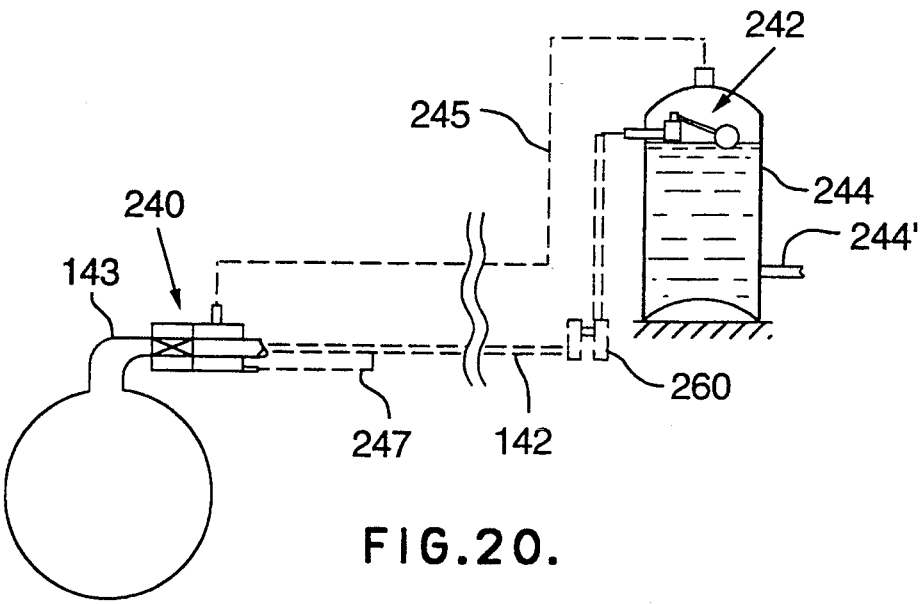
FIG. 20 is a schematic supply control system for a line.
Figure 20A:
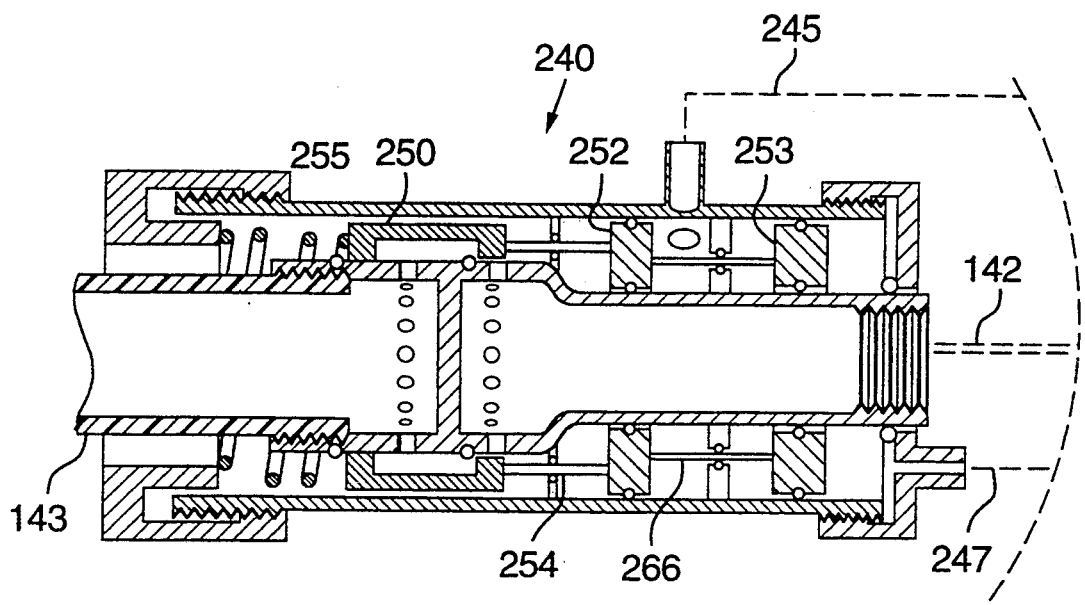
FIG. 20A is an enlargement of a portion of FIG. 20.

Referring to FIG. 20, the demand-type system is serviced by a frost-free line subject to freezing temperatures. A gas-purged frost free line 142 is used in conjunction with a pneumatically operated control valve 240, connected by off-take 143 in switching relation to a water supply main 141.

A float valve 242 is located within a non-freezing pressure tank 244, being connected in water supplying relation with the tank. The pressure-responsive control valve 240 has a slide valve member 250 which is positioned in response to spring 254, which biasses the valve slide 250 towards its open position, and annular pistons 252, 253 which cumulatively bias the valve slide 250 towards a closed position, to cut off water inflow from the main 141.

The piston 252 is subject to tank air pressure, from tank 244, by way of pneumatic line 245. The second annular piston 253 is subject by pneumatic line 247 to air pressure within the frost free purge line 142.

The second annular piston 253 applies axial loading to the first piston 252 by way of push rods 256.

In operation, with the valve slide 250 initially in its open (rightward) position to cause filling of the tank 244, the tank water level will rise to the point at which ball valve 242 goes rapidly from an open to a closed position.

This rapid close-off in water flow produces a sudden back pressure in the line 142, creating a corresponding pressure "bump" of as much as 10 psi in the air side of the line 142. This air pressure "bump" is applied to the second piston 253, by line 247.

Meanwhile, as a consequence of the tank 244 filling with water, the air pressure behind the first piston 252 increases progressively, due to air transfer through the pneumatic line 245.

The occurrence of the sudden air "bump" initiated by action of float valve 242 loads the piston system and overcomes the spring 255, to cause rapid closure of the valve slide 250.

The water pressure in line 142 drops rapidly, and the air-charged frost-free line 142 empties itself of water, by way of a low pressure drain valve, as referred to previously, above. This action also results in reducing further the air pressure in the line 242, and also behind piston 253.

The air pressure behind piston 252 then diminishes as the water volume within tank 244 becomes depleted, through supplying line 244'. When the water level in tank 244 reaches a predetermined level, and the air pressure is correspondingly lowered, the spring 255 can then over-ride the total forces applied by the pistons 252 and 253, thereby moving the valve slide 250 to reconnect the water passage of frost free line 142 to the main supply 141, to re-supply the tank 244. The pre-compression of spring 255 is adjustable, and the transmitted line air presure from tank 242 can be adjusted by the use of a pressure reducer, now shown.

The cycle of operation then repeats, thus ensuring that the line 142 is either purged of water by the purging action of the line, or is in a condition of active water flow.

It will be noted that the frost free line 142 is illustrated with a dual basket strainer 260, for the purpose of intercepting any frazil ice that may form in the line 142. The location of the basket strainer 260 in a non-freezing environment can provide natural thawing of any ice present.

Figure 21:
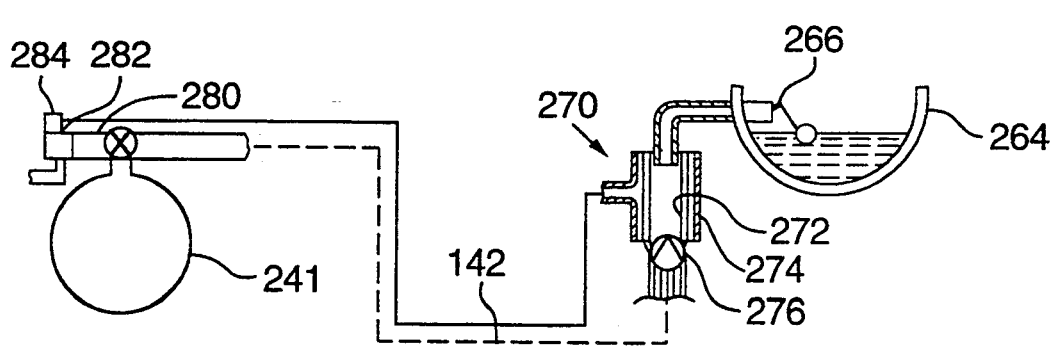
FIG. 21 is a schematic of a water supply arrangement having a pressure sensing transducer according to the present invention.

Referring to FIG. 21, the adoption of a pneumatically operated, frost free system is of particular interest and value where live stock is concerned, or where electrical power is unavailable or unreliable. Thus in this illustrated embodiment there is shown a drinking bowl 264 wherein the water level is controlled by float valve 266.

A pneumatic water pressure sensor 270 is located adjacent the bowl 264. The sensor 270 comprises a short length of compound hose having a water transporting portion 272 and an adjacent hose portion 274 containing air under pressure, being illustrated as a double-hose type of compound hose. A check valve 276 maintains the water pressure in the bowl zone at times when the frost free compound line 142 is closed down in a dewatered condition.

A small diameter pneumatic line 245, such as of ⅛ inch diameter, connects the sensor 270 to a solenoid controlled water control valve 280, having solenoid 282 and pneumatic switch 284 mounted in on-off controlling relation therewith.

The electrical valve actuating circuit may be of low voltage type, such as 24 volts, enabling ready operation thereof by battery, if desired for safety purposes. Even in the event that an outer portion of the compound hose 142 connecting the water main 241 to the user and is of metal, the interposed non-metal pressure sensor 270 is entirely electrically non-conducting, to ensure total isolation of the drinking bowl 264 from any possible electrical fault, to thereby eliminate the requirement for any ground-fault protection.

In operation, upon the level of water in bowl 264 dropping, the ball valve subsides, dropping the water pressure in the sensor 270 whereby the air pressure in line 245 drops, causing the solenoid 282 to open the water supply by way of valve 280.

Water will flow from mains 241 into the bowl 264, filling it to the point where the float rises, and float valve 266 shuts off the flow to the bowl, bringing the line 142 up to mains pressure, and causing the pressure sensed by the sensor 270 to rise to that of the mains 241. This will send a pressure rise signal along the pneumatic line 245, actuating the solenoid valve 280, to shut it off.

The water in compound line 142 will be bled off by a low pressure drain valve, as disclosed above, in conjunction with the action of the gas filled portion of compound line 142, leaving the water line portion purged and free of water, to obviate any effective freeze-up thereof.

It will of course be understood that the present invention has been described above by way of example, and modifications of detail can be made within the scope of the invention, as defined in the appended claims.

What we claim by Letters Patent of the United States is:

1. A liquid supply system for the transfer of a liquid between two locations in spaced apart relation, comprising liquid pressurizing means located at a first said location; a pipeline connecting the pressurizing means to liquid receiving means located at said second location through an intervening space subject to freezing temperatures; said pipeline having a first, laterally compressible hose portion for the transfer of said liquid therethrough; a second hose portion coextensive with said first hose portion and forming a sealed gas enclosure with said first hose portion; gas admission means connected in sealing relation with said gas enclosure; and end sealing means securing the ends of said first hose portion in sealing relation with the respective ends of said second hose portion to seal said gas enclosure therebetween, each said end sealing means including a tubular fitting having an outer end, an inner end of reduced diameter located within an end of said first hose portion; said second hose portion enclosing said first hose end portion in compressive, sandwiched relation with said tubular fitting; and load distributing means located between said first and said second hose end portions to accomodate cyclic loading of the pipeline in the expanding of said first hose portion upon the operation of said liquid pressurizing means, and the emptying thereof upon termination of said pressurizing, by the application of pressure gas in transverse collapsing relation therewith.

2. The system as set forth in claim 1, wherein said pipeline comprises said first hose portion, having a first outer diameter, and being located within said second hose portion; said second hose portion having a second, inner diameter greater than said first diameter.

3. The system as set forth in claim 1, said first and second hose portions each comprising a respective arcuate segment of a single peripheral outer hose wall and having a flexible diaphragm in interposed separating relation thereacross, said diaphragm comprising a wall portion of each said hose portion.

4. The system as set forth in claim 3, said flexible diaphragm means being elastic, to permit deformation thereof, in use, into contacting relation with at least one of two mutually adjacent inner surface portions of said outer wall.

5. The system as set forth in claim 1, including gas flow control means connected with said gas admission means; said gas flow control means including vacuum-inducing means, to reduce the internal pressure within said gas enclosure to thereby expand said hose first portion and so enhance the flow transfer cross-section of said first hose portion.

6. The combination as set forth in claim 5, said vacuum-inducing means including the air-suction side of a pump.

7. The combination as set forth in claim 6, said vacuum-inducing means including a gas pump.

8. The combination as set forth in claim 7, said gas pump being connected with pressure bottle means, control valve means connected betwen said pressure bottle means and said second hose portion, and control means connected in controlling relation with the control valve means.

9. The combination as set forth in claim 8, said control means including timer means, to cyclically control variation of pressure of said second fluid in said compound hose.

10. The combination as set forth in claim 9, said gas flow control means including a gas compressor, pressure bottle means connected thereto; control valve means connected in flow directing relation between said pressure bottle means and said second hose portion, and control means connected in controlling relation with said control valve means, to cyclically vary the gas pressure within said second hose portion.

11. The combination as set forth in claim 10, said fluid admission control valve means comprises a low voltage electric servo valve, having a pneumatically operated switch.

12. The combination as set forth in claim 7, said pressure bottle means having a vacuum bottle and a positive pressure bottle, in use to enable suction and pressure to be applied selectively to said second hose portion, in response to said control valve means.

13. The supply system as set forth in claim 1 including drainage valve means connected with said first hose portion, in use to drain said liquid therefrom upon the termination of pressurizing action of said liquid pressurizing means, and under the hose-compressive action of said gas-filled enclosure acting in compressive relation upon said first hose portion.

14. The combination as set forth in claim 13, said drainage valve means including an annular valve seat; closure disc means in movable sealing relation therewith; and spring means in disc opening relation with said valve seat, in use to raise said disc means therefrom, in liquid draining relation with said first hose portion.

15. The combination as set forth in claim 14, said drainage valve having spring means connected in position controlling relation with a valve closure portion.

16. The combination as set forth in claim 15, said valve having a drainage outlet located at a lower portion of the valve, said spring means including a spring positioned to bias said valve to an open condition.

17. The combination as set forth in claim 16, said spring comprising a plastic spring located within said valve in thermally protected relation from the environment exterior to and adjacent said valve.

18. The combination as set forth in claim 17, said valve having a drainage outlet located at a lower portion of the valve, said plastic spring biassing said valve to an open condition, to enable drainage of said hose first portion upon cessation of said first pumping pressure condition, to substantially preclude freezing of the contents of said hose first portion.

19. The combination as set forth in claim 18, said plastic spring comprising an open ended tube.

20. The combination as set forth in claim 18, said plastic spring comprising a die-cast hinge connecting a pivotal flap portion of said valve to a body portion thereof, said hinge having plastic memory biassing said flap towards an open position.

21. The combination as set forth in claim 14, said closure disc means having a resilient hinge connected to said valve seat, said spring means comprising said resilient hinge, to urge said disc from said seat to a raised position.

22. The liquid supply system as set forth in claim 1 including condition sensing means for sensing a condition in the environment of said system, supply control means connected in controlling on/off relation with said liquid pressurizing means, to control the ingress of said liquid to said pipeline, and a gas charge within said pipeline at a pressure above atmospheric, in use to empty said liquid from said pipeline upon actuation of said supply control means to terminate the ingress of said liquid to said pipeline.

23. The combination as set forth in claim 22, said condition sensing means being responsive to a local ambient condition indicative of the presence of fire.

24. The combination as set forth in claim 22, said condition sensing means being responsive, in use to a local ambient condition indicative of the likelihood of frost.

25. The combination as set forth in claim 22, said condition sensing means comprising a length of said pipeline isolated from the adjoining main portion thereof by way of a check valve so as to retain liquid within said length under pressure when said pipeline is emptied of liquid, and air pressure transfer means connecting said condition sensing means to said supply control means, in controlling relation therewith.

26. The supply system as set forth in claim 1, in combination with a second, like liquid transfer system connected in serial flow relation with the first said pipeline, and including at a juncture of said pipelines a branch line having a shut off valve therein, to isolate said branch line from said pipelines, and a drain valve to drain said first hose portions on termination of liquid transfer through said pipelines.

* * * * *